L. DODGE.
Hay, Straw and other Bales.
No. 6,243. Reissued Jan. 19, 1875.
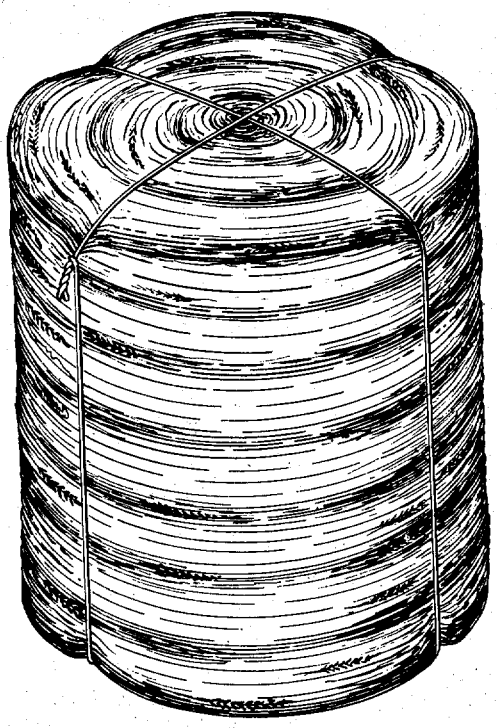
Witnesses.
Everett Dick
Wm. E. Chaffee
Inventor.
Levi Dodge
by atty H Brown

UNITED STATES PATENT OFFICE.

LEVI DODGE, OF WATERFORD, NEW YORK.

IMPROVEMENT IN HAY, STRAW, AND OTHER BALES.

Specification forming part of Letters Patent No. 125,031, dated March 26, 1872; reissue No. 6,243, dated January 19, 1875; application filed January 4, 1875.

*To all whom it may concern:*

Be it known that I, LEVI DODGE, of Waterford, in the county of Saratoga, State of New York, have invented certain Improvements in Bales of Hay, Straw, Cotton, or other substances to be packed in a compressed condition and in bale form, of which the following is a specification:

In Letters Patent of the United States, No. 120,048, granted to me the 17th October, 1871, I have described a baling-press in which the cotton, hay, straw, or other material to be baled is compressed in successive layers against a yielding platform or support until by this means a bale has been built up and formed, which, after being bound to retain it in its compressed state, is removed from the machine. A bale thus made up of layers which are transverse to the length of the bale possesses valuable properties and characteristics which distinguish it from others heretofore in the market. In order that the advantages resulting from this way of making the bale may be properly understood and appreciated, I would state that it is now and has been for a long time past usual to make bales of certain ascertained weight, which weight is understood to attach to the bale. For instance, a cotton-bale, by those in the cotton trade, is understood to have a certain standard weight, from which bales of cotton will vary but little, if any. It is with reference to these standard weights that transportation, both by rail and vessel, and business in general, so far as it relates to these products, are organized. It is of importance to concentrate this weight within the smallest possible space, or, in other words, increase the quantity by decreasing the volume, for in this way the same means of transportation can be made effective to transport a greater quantity of the baled material.

In all bales of which I have knowledge, in which there are distinctive layers of material, these layers have heretofore extended in the direction of the length of the bale. For instance, in a cotton bale, the layers in the press will be usually about five feet in length by two feet in width. The bale composed of a number of these layers, coming from the plantation press, is about five feet long, two feet wide, and three and one-half thick. It is subsequently subjected to a more powerful press, in which it is reduced from three and one-half feet to six inches in thickness, so that just before it is taken from the press, where, of course, it is first bound before removal, it has the form of a slab, five feet long, two feet wide, and six inches thick; but no bands or ties have power to hold it in this shape. As soon as it is taken from the press it begins to expand in a direction just opposite to that in which it was compressed, oftentimes causing the bands to burst; and this expansion continues usually until the bale is about as thick as it is wide. In other words, it expands from a foot to a foot and a half, thus increasing two or three fold its bulk.

It is of great importance that the bale should retain the bulk it had in the press; but this is impossible where, as in the above instance, the layers are in the direction of the length of the bale. The increase in bulk being in proportion to the extent of surface in the direction of which the expansion takes place, it follows that this increase must necessarily reach its highest point in those bales in which the expansion takes place in the direction of the most extended faces.

In the bale which I have invented the layers are transverse to the length of the bale—that is to say, the bale is built up endwise, the successive layers being substantially parallel with the ends of the bale, or those faces which are the smallest, and which bound at each end the longer faces of the bale. The expansion in this case is reduced to the minimum. It takes place in a direction at right angles with the layers, and these layers having an area coextensive only with the smallest faces of the bale expose but a small surface which can be affected in any way by the expansion, so much so, indeed, that in my bale, having the same bulk as the ordinary plantation-bale, I can concentrate from seventy-five to a hundred per cent. more material by weight than is contained in said ordinary bale.

The accompanying drawing represents a bale made under my invention in my patented press. The cylindrical shape of the bale is incident to its having been built up in a cylindrical form or case; but, as provided in my said Letters Patent hereinbefore referred to, said case is not necessarily a cylinder, but may be of any other suitable shape, to which shape the bale will, of course, correspond.

Having described my invention, what I claim, and desire to secure by Letters Patent, is—

A pressed bale of hay, cotton, straw, or other fibrous material, built up endwise in layers which are transverse to the length of the bale, substantially as set forth.

In testimony whereof I have hereunto signed my name this 14th day of December, A. D. 1874.

LEVI DODGE.

Witnesses:
EWELL A. DICK,
HENRY R. ELLIOTT.